W. A. McDonald.
Cheese Cutter.

Nº 88,500. Patented Mar. 30, 1869.

Witnesses: Inventor:

WILLIAM A. McDONALD, OF ALNA, MAINE, ASSIGNOR TO F. G. COOKER, FOR ONE-HALF HIS RIGHT

Letters Patent No. 88,500, dated March 30, 1869.

IMPROVED CHEESE-CUTTER.

The Schedule referred to in these Letters Patent and making part of the same.

*To all whom it may concern:*

Be it known that I, WILLIAM A. McDONALD, of Alna, in the county of Kennebec, and State of Maine, have invented a new and useful Improvement in Cheese-Cutters; and I do hereby declare the following to be a full, clear, and exact description of the same, sufficient to enable others skilled in the art to which my invention appertains, to make and use the same, reference being had to the accompanying drawings, forming part of this specification, and in which—

Figure 1:
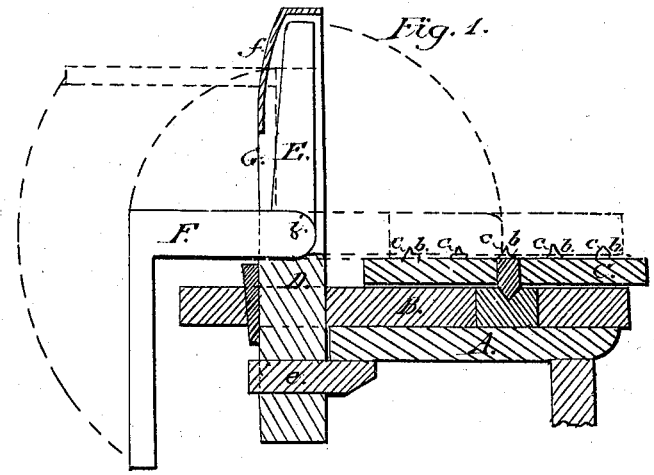
Figure 2:
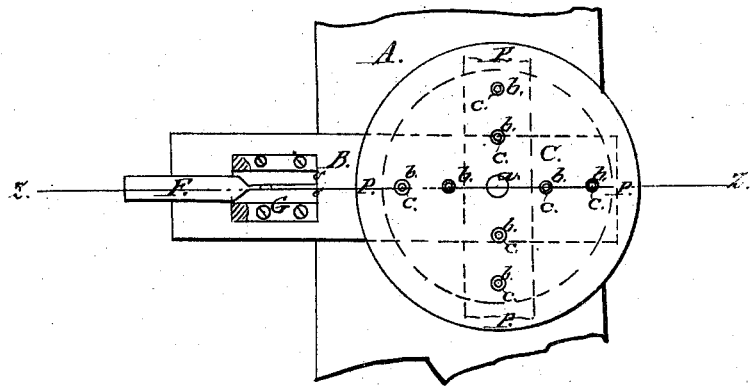

Figure 1 is a longitudinal vertical central section of my improved cheese-cutter, and Figure 2 is a top view of the same.

Similar letters of reference indicate corresponding parts in the two figures.

My invention relates to a device for holding and cutting cheese, and consists in constructing a pivoted knife with an angular handle, said knife having its bearing in a standard, keyed to the bed-piece.

It further consists in a metallic frame, so arranged with the knife, that it will serve as a cleaner, stop, and protector.

In the drawings—

A is a store-counter, or table, on which is placed a bed-piece, B, provided with a pivot, $a$, on which revolves a table, C, for holding the cheese while being cut.

The cheese rests on pins, $b\ b$, provided with shoulders, $c\ c$, said shoulders serving to keep the cheese raised above the surface of the table C about one-eighth or one-fourth of an inch, as shown in red, fig. 1.

An opening is made in the rear part of the bed-piece B, through which is placed a standard, D, said standard being secured to the bed-piece by means of a key, $d$, driven in between it and the bed-piece.

A similar opening is made in the lower part of the standard D, through which is driven a key, $e$, for fastening the same to the counter, or table.

A knife, E, working on a pivot, $i$, is mounted on the standard D. The blade of this knife is of ordinary construction. The handle, F, may be made of cast-iron, or other suitable material, so as to be heavier than the blade.

The object of my making the handle heavier than the blade is, that after the blade has cut through the cheese, the weight of the handle causes it to resume its former upright position.

To protect the blade of the knife, I place a metallic frame, G, over it. The upper portion of the back of this frame is closed, as at $f$, fig. 1, to form a stop for the knife. The sides $g$, of the frame, serve as clearers to clean the particles of cheese from the blade, after it has returned from cutting the same.

The operation is as follows:

The cheese is placed upon the pins $b\ b$, on the table C, and, as before stated, by means of the shoulders $c\ c$, of the pins, is raised above the table C, so that the blade of the knife may pass entirely through while cutting. Either a large or small portion may be cut by simply moving the table C round.

When operating other cheese-cutters, it is often necessary to use a separate knife, to cut through the lower portion of the cheese.

I avoid all this unnecessary labor, by employing pins, provided with shoulders. If desired, the pins $b\ b$ may be removed, and the machine used as a bread-cutter, the operation being the same as above described.

It will be seen, that by pivoting the knife, as shown, a draw-cut is produced, which is very effective.

I am aware that the use of revolving tables in cheese-cutters is not new. This I do not claim, broadly; but having thus described my invention,

What I claim as new, and desire to secure by Letters Patent, is—

1. In cheese-cutters, the pivoted blade, cast, or formed with a weighted handle, substantially as and for the purpose described.

2. The knife E, with weighted handle F, in combination with the standard D, frame G, and revolving table C, with pins, $b\ c$, substantially as and for the purpose described.

3. The metallic frame G, constructed as described, in combination with the knife E, and standard D, as and for the purpose set forth.

4. The combination of the knife E, frame G, standard D, bed-piece B, table C, with pins $b\ b$, all constructed, arranged, and operating substantially as and for the purpose herein described.

In testimony that I claim the above, I have hereunto subscribed my name, in presence of two witnesses.

WM. A. McDONALD.

Witnesses:
D. M. TEAGUE,
R. M. MANSUR.